(12) United States Patent
Kanzaki

(10) Patent No.: US 6,996,704 B2
(45) Date of Patent: Feb. 7, 2006

(54) TRACE CONTROL CIRCUIT ADAPTED FOR HIGH-SPEED MICROCOMPUTER OPERATION

(75) Inventor: Teruaki Kanzaki, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 113 days.

(21) Appl. No.: 10/639,582

(22) Filed: Aug. 13, 2003

(65) Prior Publication Data

US 2004/0049665 A1   Mar. 11, 2004

Related U.S. Application Data

(62) Division of application No. 09/588,604, filed on Jun. 7, 2000, now Pat. No. 6,633,973.

(30) Foreign Application Priority Data

Dec. 24, 1999   (JP) ................................ 11-368224

(51) Int. Cl.
*G06F 11/34* (2006.01)

(52) U.S. Cl. ...................................... 712/227; 714/45
(58) Field of Classification Search ................ 714/45; 712/227

See application file for complete search history.

(56) References Cited

U.S. PATENT DOCUMENTS

| | | | |
|---|---|---|---|
| 5,574,937 A | 11/1996 | Narain | |
| 5,625,785 A | 4/1997 | Miura et al. | |
| 5,933,626 A | 8/1999 | Mahalingaiah et al. | |
| 6,154,857 A | 11/2000 | Mann | |
| 6,463,551 B1 | 10/2002 | Kanzaki et al. | |
| 6,523,136 B1 | 2/2003 | Higashida | |
| 6,594,782 B1 * | 7/2003 | Tagawa | 714/30 |
| 6,615,370 B1 * | 9/2003 | Edwards et al. | 714/45 |

FOREIGN PATENT DOCUMENTS

| | | |
|---|---|---|
| JP | 3-240839 | 10/1991 |
| JP | 3-266140 | 11/1991 |
| JP | 5-197549 | 8/1993 |

OTHER PUBLICATIONS

"Logic Interface to Allow High Performance Event Tracing With Low Performance Monitoring Devices", IBM Technical Disclosure Bulletin, vol. 29, No. 5, p. 2076-2079, Oct. 1986.

* cited by examiner

*Primary Examiner*—William M. Treat
(74) *Attorney, Agent, or Firm*—Buchanan Ingersoll PC

(57) ABSTRACT

A branching source address in an absolute address representation and a branching destination address in a relative address representation are captured from a CPU so that the branching source address and the branching destination address are output tot he trace bus.

3 Claims, 12 Drawing Sheets

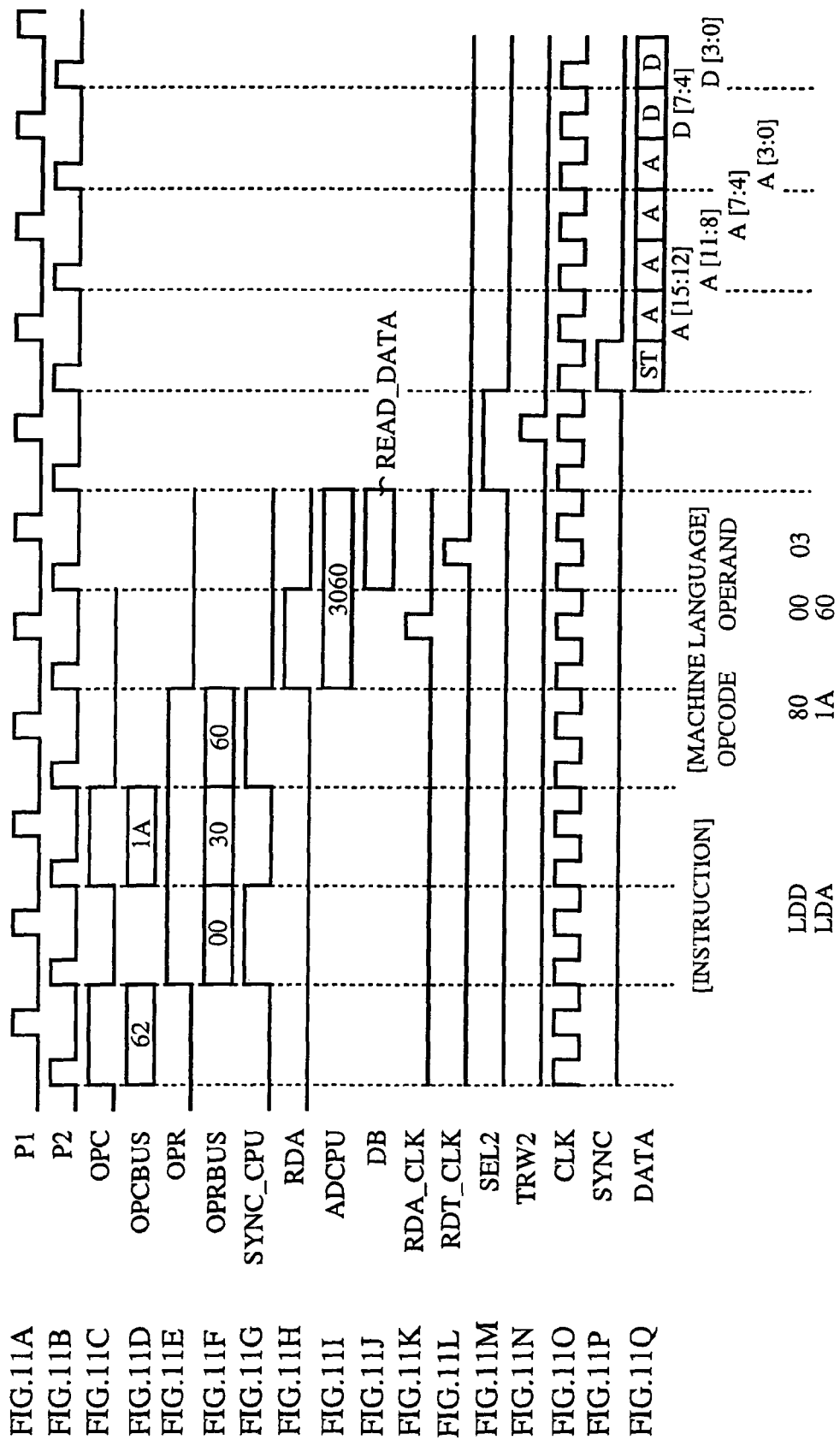

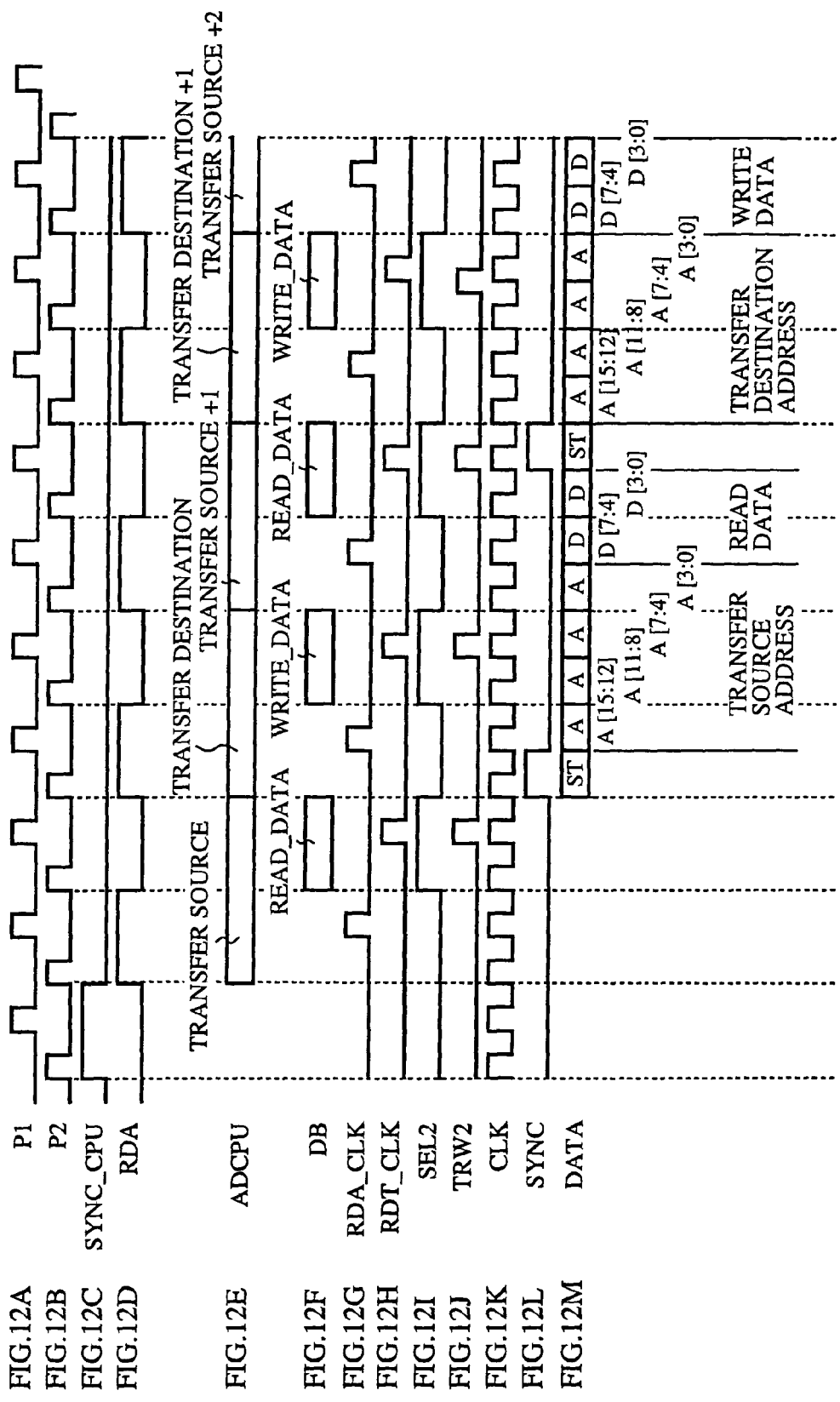

TRACE CONTROL CIRCUIT ADAPTED FOR HIGH-SPEED MICROCOMPUTER OPERATION

This application is a divisional of application Ser. No. 09/588,604, filed on Jun. 7, 2000 U.S. Pat. No. 6,633,973.

BACKGROUND OF THE INVENTION

1. Field of the Invention

This invention relates to a trace control circuit constituting a part of a debugging circuit built into a microcomputer.

2. Description of the Related Art

Generally speaking, an in-circuit emulator (ICE) is used for program debugging in a microcomputer. The function of an ICE is to emulate the function of the microcomputer subject to program debugging. An address bus and a data bus of the microcomputer are connected to a memory on the ICE. A host computer controlling the ICE downloads a program executed by the microcomputer to the memory on the ICE so that the microcomputer is operated.

In an LSI having a built-in microcomputer, the program is usually stored in a memory provided in the microcomputer. For this reason, the address bus and the data bus for connection with the memory on the ICE are not provided in the terminals of the LSI.

Therefore, a mode dedicated to connection to the ICE is provided. In this mode, the address bus and the data bus are connected to the memory on the ICE by leading the address bus and the data bus to external terminals of the LSI, so that emulation using the ICE is enabled.

However, since the connection between the ICE and the system LSI requires as many connections as the number of terminals in the microcomputer, connection between the ICE and the system LSI involves difficulties as the speed of the microcomputer and the number of buses are increased. It is to be noted further that various functions for system implementation other microcomputer functions are built into the system LSI with a built-in microcomputer. It is thus difficult to perform emulation of the function of the external terminals of the LSI to which the address bus and the data bus are led for connection with the memory on the ICE.

In this background, recently, a debugging circuit complementing the ICE function is built into the microcomputer and connected to an external debugger via LSI terminals dedicated to debugging.

FIG. 7 is a block diagram showing a related-art microcomputer. Referring to FIG. 7, numeral 1 indicates a microcomputer having a built-in debugging circuit 5; 2 indicates a central processing unit (CPU) of the microcomputer 1; 3 indicates a bus interface; 4 indicates a memory; and 5 indicates a debugging circuit for debugging a program of the microcomputer 1 by inputting and outputting data via an external debugger and a trace bus. The debugging circuit 5 is provided with a DATA terminal for inputting and outputting multi-bit DATA to and from the external debugger, a CLK terminal for inputting and outputting a clock signal CLK, an OE terminal for inputting and outputting a control signal OE for controlling input and output of the DATA and the clock signal CLK, and a SYNC terminal for inputting and outputting a synchronization signal SYNC when the tracing is performed.

Numeral 6 indicates a register control circuit for receiving data from the DATA terminal when the external debugger outputs the data to the DATA terminal and for decoding the data; 7 indicates a download control circuit for receiving a program generated by a host computer via the external debugger and downloading the program to the memory 4; 8 indicates a trace control circuit for notifying the external debugger of the operating status of the CPU 2; 9 indicates a comparator for comparing an address at which the program is executed with preset data in order to recognize the operating condition of the CPU 2; and 10 indicates a register circuit.

A description will now be given of the operation according to the related art.

The debugging circuit 5 built in the microcomputer 1 mainly provides the following functions.

Communication Between the External Debugger and the Debugging Circuit 5

When the external debugger outputs the data to the trace bus under the control of the host computer, the register control circuit 6 of the debugger circuit 5 receives the data via the DATA terminal for decoding so as to determine the destination of the data.

Depending on the result of determination, the register control circuit 6 outputs the data to the download control circuit 7, the trace control circuit 8, the comparator 9 or the register circuit 10.

When the incoming data requests reading of data stored in the register circuit 10, the register control circuit 6 reads the data stored in the register circuit 10.

Downloading

When the external debugger outputs the program generated by the host computer to the trace bus under the control of the host computer, the download control circuit 7 of the debugger circuit 5 receives the program via the DATA terminal.

The download control circuit 7 downloads the program to the memory 4 by using the control bus, the address bus ADCPU, and the data bus DB.

Tracing

The trace control circuit 8 recognizes the operating condition of the CPU 2 by capturing signals on the control bus, the address bus ADCPU and the data bus DB, which connect the CPU 2 and the bus interface 3, and outputs the operating condition of the CPU 2 to the external debugger via the DATA terminal and the trace bus.

Breaking

When the external debugger outputs the address at which the program is executed and the data to the comparator 9 under the control of the host computer, via the CLK terminal, the DATA terminal, the OE terminal and the SYNC terminal, the address and the data being specified by the host computer, the comparator 9 compares the status of the address bus ADCPU with the written address.

When they match, the comparator 9 executes an interrupt processing program downloaded to the memory 4 by outputting an interrupt request to the CPU 2. For example, the comparator 9 enables the CPU 2 and the external debugger to transfer data via the register circuit 10.

The following steps for program debugging are taken using the functions described above.

(1) The host computer generates a program.
(2) The program is downloaded to the memory 4 of the microcomputer 1.
(3) The host computer requests execution of the program and keeps track of the operating conditions of the microcomputer 1 from a trace output from of the debugging circuit 5.
(4) A break interrupt is generated at a program address specified by the host computer. In this interrupt process, the host computer communicates with the debugging circuit 5 via the external debugger so as to learn the status of the microcomputer 1.

FIG. 8 shows the internal construction of the trace control circuit 8 of FIG. 7. Referring to FIG. 8, numeral 11 indicates a branch event generation circuit for generating an event necessary for execution of a branch trace in accordance with a control signal output from the CPU 2 to the control bus to require execution of the branch instruction. Numeral 12 indicates a status generation circuit for generating status information ST indicating the branch trace; 13 indicates an AND circuit for ANDing a synchronization signal SYNC_CPU occurring during the execution and a basic clock P1 of the CPU 2, and for outputting BRAS_CLK. Numeral 14 indicates a branching source address latch for latching a branching source address in synchronization with BRAS_CLK.

Numeral 15 indicates an AND circuit for ANDing an operand fetch signal OPR occurring during the execution and the basic clock P1 of the CPU 2, and for outputting BRAD_CLK; 16 indicates a branching destination address latch for latching, in synchronization with BRAD_CLK, a branching destination address output from the CPU 2 to the address bus ADCPU; 17 indicates a logic circuit for outputting a selector control signal SEL1 in synchronization with a falling edge of a branching destination signal RCLR occurring subsequent to the execution of the branch instruction; and 18 indicates an AND circuit for ANDing the selector control signal SEL1 and the basic clock P1 of the CPU 2, and for outputting a trace memory write signal TRW1.

Numeral 19 indicates a CPU access event generation circuit for generating an event necessary for execution of a memory trace in accordance with a control signal output from the CPU to require execution of an instruction requiring an access to the memory 4; and 20 indicates an OR circuit for ORing the trace memory write signal TRW1 output from the AND circuit 18 of the branch event generation circuit 11 and a trace memory write signal TRW2 output from the access event generation circuit 19.

Numeral 21 indicates a selector for selecting an event output from the branch event generation circuit 11 or an event output from the CPU access event generation circuit 19, and for writing the event in a trace memory 22 for containing the contents of the event. Numeral 23 indicates a trace circuit for reading the contents of the event from the trace memory 22 and outputting the contents to the trace bus via the DATA terminal.

A description will now be given of the operation of the trace control circuit 8. The operation described below is performed when the branch instruction from the CPU 2 is executed. It is assumed here that the address bus ADCPU is a 16-bit bus and the DATA terminal and the trace bus are of a 4-bit construction.

When the CPU 2 outputs the control signal to the control bus to require execution of the branch instruction, the status generation circuit 12 of the branch event generation circuit 11 recognizes the requirement of the branch instruction from the control signal. The status generation circuit 12 generates the status information ST for informing the external debugger that the CPU 2 event is a branch trace.

When the CPU 2 outputs the branching source address to the address bus ADCPU as it outputs the control signal, the branch source address latch 14 latches the branching source address in synchronization with BRAS_CLK output from the AND circuit 13.

When the CPU 2 outputs the branching destination address to the address bus ADCPU subsequent to the output of the branching source address, the branching destination address latch 16 latches the branching destination address in synchronization with BRAD_CLK output from the AND circuit 15.

The branching source address and the branching destination address are absolute addresses in the memory 4 and have a 16-bit resolution.

The selector 21 sequentially captures the contents of the event output from the branch event generation circuit 11, that is, the status information ST, the branching source address and the branching destination address. When the selector control signal SEL1 is brought to a high level, the selector 21 opens its internal gate. When the trace write signal TRW1 is brought to a high level, the selector 21 writes the status information ST, the branching source address and the branching destination address to the trace memory 22.

When the contents of the event output from the branch event generation circuit 11 are written in the trace memory 22, the contents of the event are sequentially read by the trace circuit 23. The trace circuit 23 then outputs the contents of the event to the external debugger via the trace bus and the DATA terminal, in synchronization with the clock signal CLK and the synchronization signal SYNC.

For example, as shown in FIG. 9P, when the synchronization signal SYNC goes high, indicating the head of the event, the trace circuit 23 outputs the status information ST, the branching source address A[15:12], the branching source address A[11:8], the branching source address A[7:4], the branching source address A[3:0], the branching destination address A[15:12], the branching destination address A[11:8], the branching destination address A[7:4] and the branching destination address A[3:0], in the stated order, to the 4-bit DATA terminal.

In this illustration, A[:] indicates bits corresponding to the absolute address. For example, [7:4] indicates absolute address values from the seventh significant bit to the fourth significant bit.

In the illustrated example, a total of nine CLK cycles are required in order to output the event of the branch instruction.

Referring to FIG. 9, P2 indicates a basic block of the CPU 2, OPC indicates an opcode fetch signal occurring during the execution, OPCBUS indicates an opcode, and OPRBUS indicates an operand bus. At the bottom of FIG. 9 is given an example where the branch instruction BRA (with the opcode "80") causes a jump to the address having a label "TEST_" attached thereto.

Since the trace control circuit according to the related art is constructed as described above, it is necessary to increase the number of the DATA terminals and capacity of the trace memory 22 as the bus width of the address bus ADCPU or the data bus DB is increased and the cycle of instructions being executed is increased for improvement in the speed of the microcomputer 1. However, the number of terminals cannot be increased readily in a highly integrated LSI, making it difficult to adapt for improvement in the speed of the microcomputer 1.

SUMMARY OF THE INVENTION

Accordingly, a general object of the present invention is to provide a trace control circuit in which the aforementioned problem is eliminated.

Another and more specific object of the present invention is to provide a trace control circuit capable of adapting to improvement in the speed of the microcomputer without increasing the number of terminals such as the DATA terminals.

The aforementioned objects can be achieved by a trace control circuit comprising: determination means for determining whether a CPU outputs a branching source address or a branching destination address, based on a control signal output from the CPU; address capturing means for capturing the branching source address in an absolute address representation from the CPU, when the determination means determines that the CPU has output the branching source address, and for capturing the branching destination address in a relative address representation, when the determination means determines that the CPU has output the branching destination address; and outputting means for outputting the branching source address and the branching destination address captured by the address capturing means to a trace bus.

The determination means may demand requests the address capturing means to capture the branching destination address in an absolute address representation, when the control signal output from the CPU indicates an output of the branching destination address in an absolute address representation.

The aforementioned objects can also be achieved by a trace control circuit comprising: address capturing means for capturing a relative address in a memory accessed by a CPU; data capturing means for capturing access data of the CPU; and output means for outputting a reference address to a trace bus and outputting the relative address in the memory captured by the address capturing means and the access data captured by the data capturing means.

The trace control circuit may further comprise: determining means for determining whether the CPU outputs the relative address in the memory or the absolute address thereof, and for requesting the address capturing means to capture one of the relative address and the absolute address.

The aforementioned objects can also be achieved by a trace control circuit comprising: address capturing means for capturing an address in a memory accessed by a CPU; data capturing means for capturing data for block transfer; and output means for outputting to a trace bus the address captured by the address capturing means and the data captured by the data capturing means upon a first access in the block transfer, and for outputting the data captured by the data capturing means to the trace bus upon a second and subsequent accesses.

The output means may output a reference address to the trace bus, when the address captured by the address capturing means is a relative address.

BRIEF DESCRIPTION OF THE DRAWINS

Other objects and further features of the present invention will be apparent from the following detailed description when read in conjunction with the accompanying drawings, in which:

FIGS. 11A–11Q are timing charts of signals in the circuit of FIG. 10; and

FIGS. 12A–12M are timing charts of signals in the related-art trace control circuit.

DETAILED DESCRIPTION OF THE PREFERRED EMBODIMENTS

First Embodiment

Figure 1:
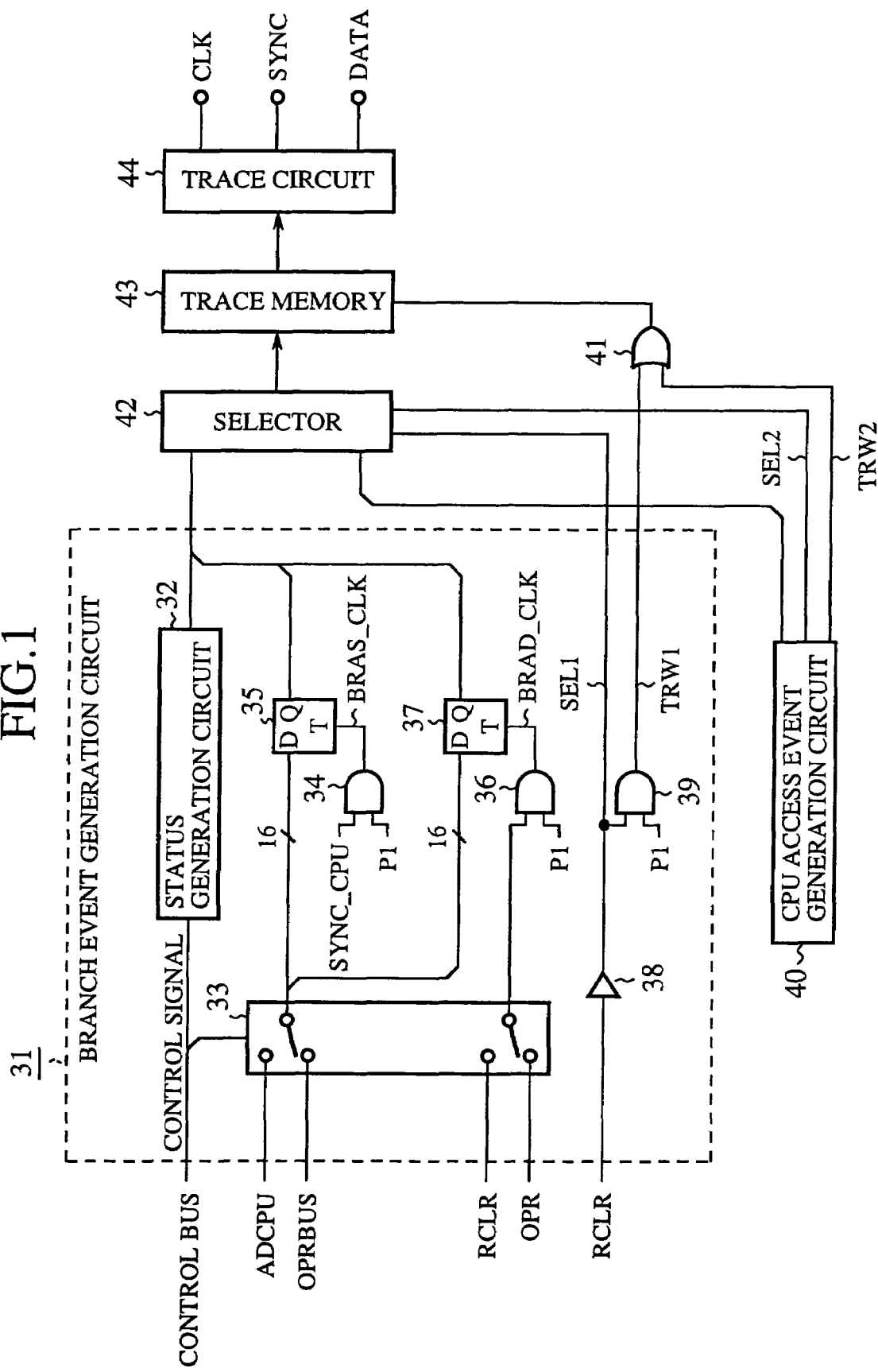
FIG. 1 shows the construction of the trace control circuit according to the first embodiment of the present invention.
Figure 7:
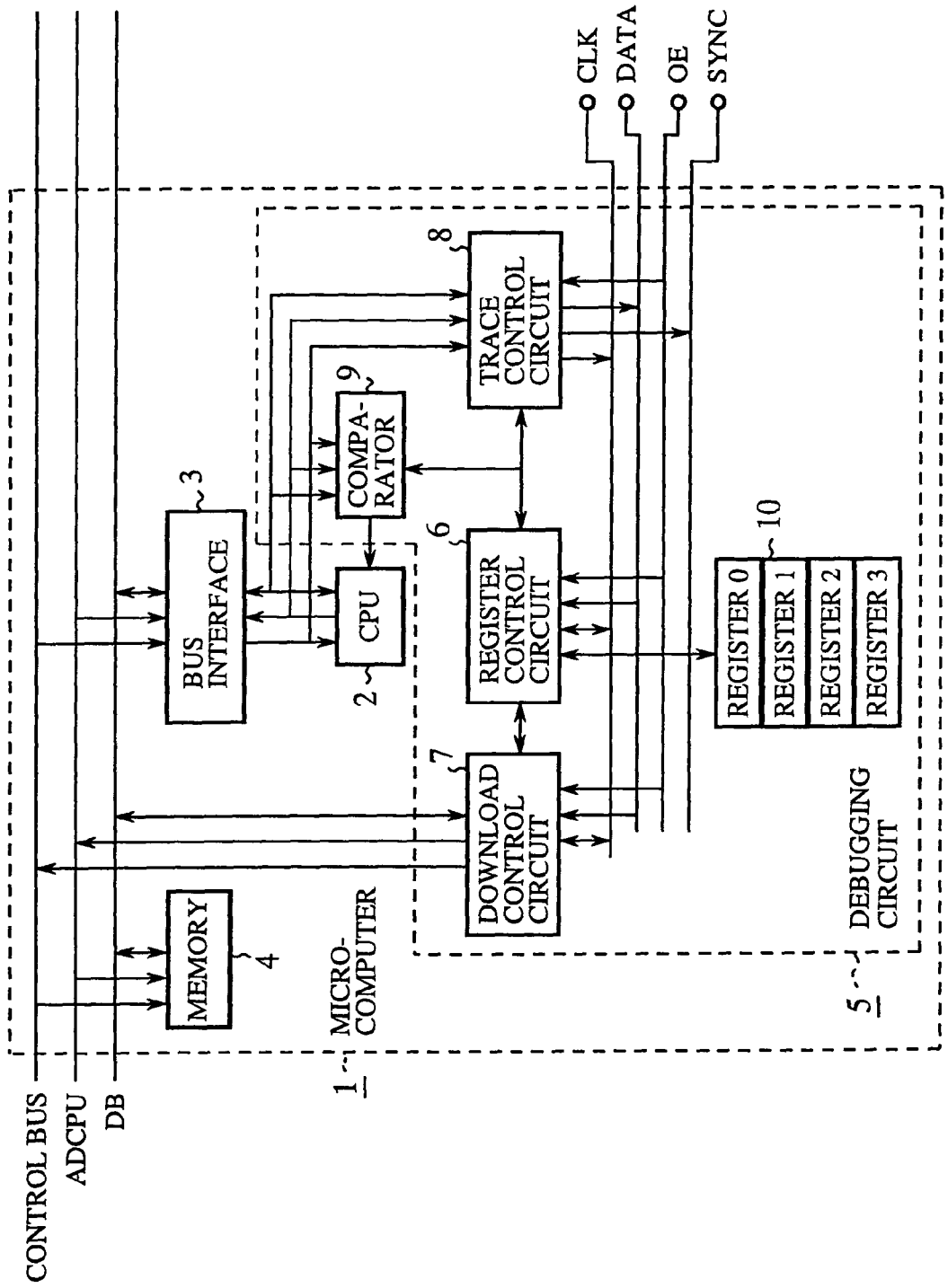
FIG. 7 shows the construction of the microcomputer according to the related art.
Figure 8:
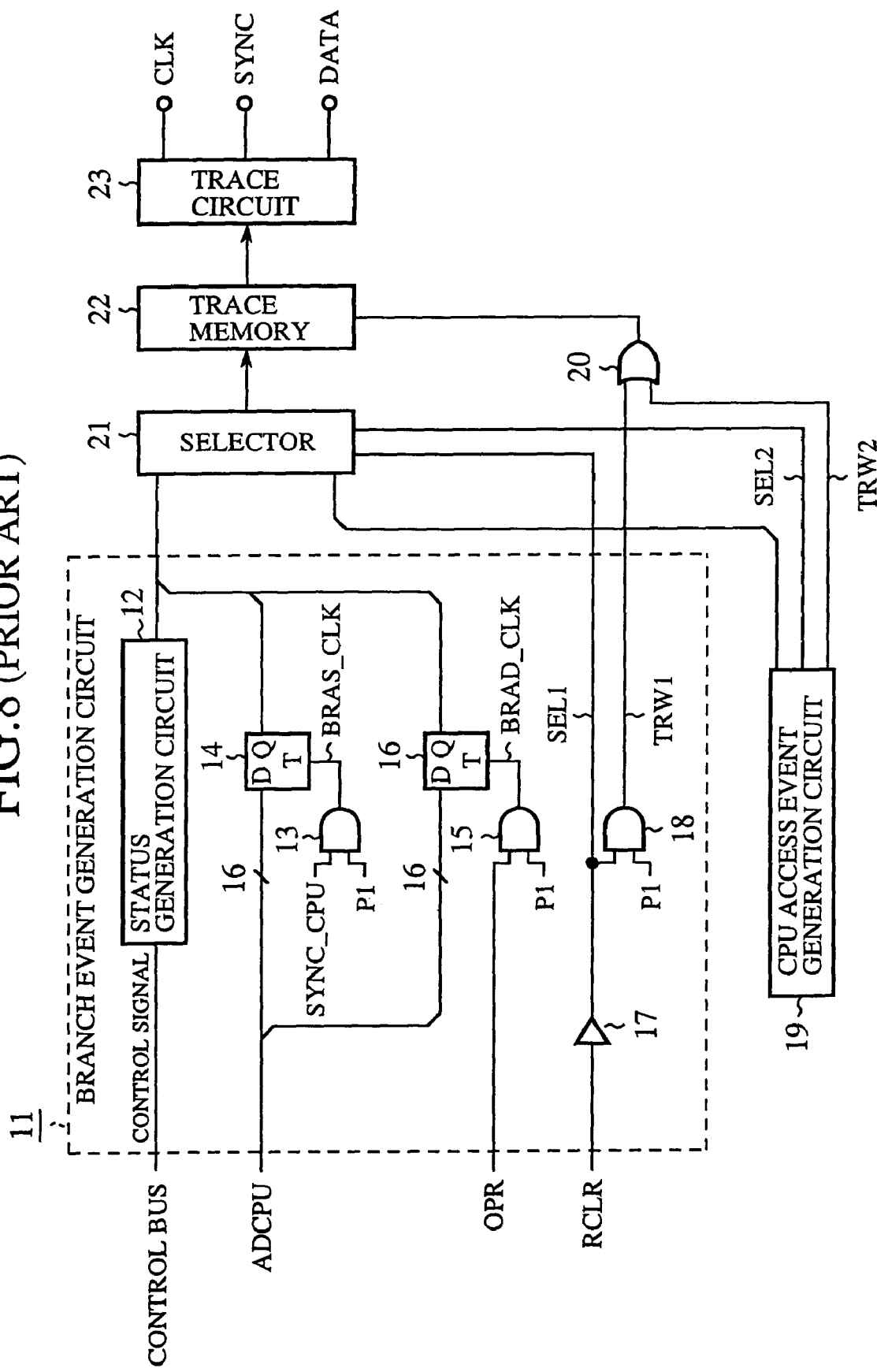
FIG. 8 shows the construction of the trace control circuit according to the related art.

FIG. 1 shows the construction of the trace circuit according to the first embodiment of the present invention. Referring to FIG. 1, numeral 31 indicates a branch event generation circuit for generating, when the CPU 2 as shown in FIG. 7 outputs a control signal requesting execution of a branch instruction to a control bus, an event necessary for execution of branch trace; 32 indicates a status generation circuit for outputting status information ST indicating branch trace; 33 indicates a selector circuit. The selector circuit 33 determines whether the address output by the CPU 2 is a branching source address or a branching destination address. If it is determined that the CPU 2 has output the branching source address, the selector circuit 33 connects an address bus ADCPU to an input terminal of a branching source address latch 35. If it is determined that the CPU 2 has output the branching destination address, the selector circuit 33 connects an operand bus OPRBUS to an input terminal of a branching destination address latch 37.

Numeral 34 indicates an AND circuit for ANDing the synchronization signal SYNC_CPU occurring during the execution and a basic clock P1 of the CPU 2 and outputting BRAS_CLK; 35 indicates the branching source address latch for latching the branching source address in synchronization with BRAS_CLK, when the CPU 2 outputs the branching source address in an absolute address representation to the address bus ADCPU. Numeral 36 indicates an AND circuit for ANDing two signals, the first signal being a branching destination signal RCLR occurring subsequent to the execution of the branch instruction or an operand fetch signal OPR occurring during the execution, and the second signal being the basic clock P1 of the CPU 2, and for outputting BRAND_CLK. Numeral 37 indicates the branching destination address latch for latching the branching destination address in a relative address representation output by the CPU 2 to the operand bus OPRBUS. The AND circuit 34, the branching address latch 35, the AND circuit 36 and the branching address latch 37 constitute the address capturing means.

Numeral 38 indicates a logic circuit for outputting a selector control signal SEL1 in synchronization with a falling edge of the branching destination signal RCLR occurring subsequent to the execution of the branch instruction. Numeral 39 indicates an AND circuit for ANDing the selector control signal SEL1 and the basic clock P1 of the CPU 2, and for outputting a trace memory write signal TRW1; 40 indicates a CPU access event generation circuit for generating an event necessary for execution of memory trace in accordance with a control signal output from the CPU 2 to request execution of an instruction for accessing a memory (for example, the memory 4 and the register circuit 10). Numeral 41 indicates an OR circuit for ORing the trace memory write signal TRW21 output from the AND circuit 39 of the branch event generation circuit 31, and a trace memory write signal TRW2 output from the CPU access event generation circuit 40.

Numeral 42 indicates a selector for selecting the event output from the branch event generation circuit 31 or the event output from the CPU access event generation circuit 40, and for writing the contents of the event to a trace memory 43. Numeral 43 indicates the trace memory for storing the contents of the event; and 44 indicates a trace circuit (output means) for reading the contents of the event and outputting that contents to the trace bus via the DATA terminal.

A description will now be given of the operation according to the first embodiment.

The following description relates to the operation performed when the branch instruction of the CPU 2 is executed. It is assumed here that the address bus ADCPU and the operand bus OPRBUS are of a 16-bit construction and the DATA terminal and the trace bus are of a 4-bit construction.

When the CPU 2 outputs the control signal requesting execution of the branch instruction to the control bus, the status generation circuit 32 of the branch event generation circuit 31 recognizes the request for execution of the branch instruction from the control signal. The status generation circuit 32 generates the status information ST indicting branch trace to inform the external debugger that the CPU 2 event is the branch trace.

The selector circuit 33 determines whether the current address output by the CPU 2 is a branching source address or a branching destination address based on the control signal output from the CPU 2.

When it is determined that the branching source address is output, the selector circuit 33 connects the address bus ADCPU to an input terminal of the branching source address latch 35.

The branching source address latch 35 latches the branching source address in an absolute address representation, output from the CPU 2 to the address bus ADCPU, in synchronization with BRAS_C output from the AND circuit 34.

Figure 2:
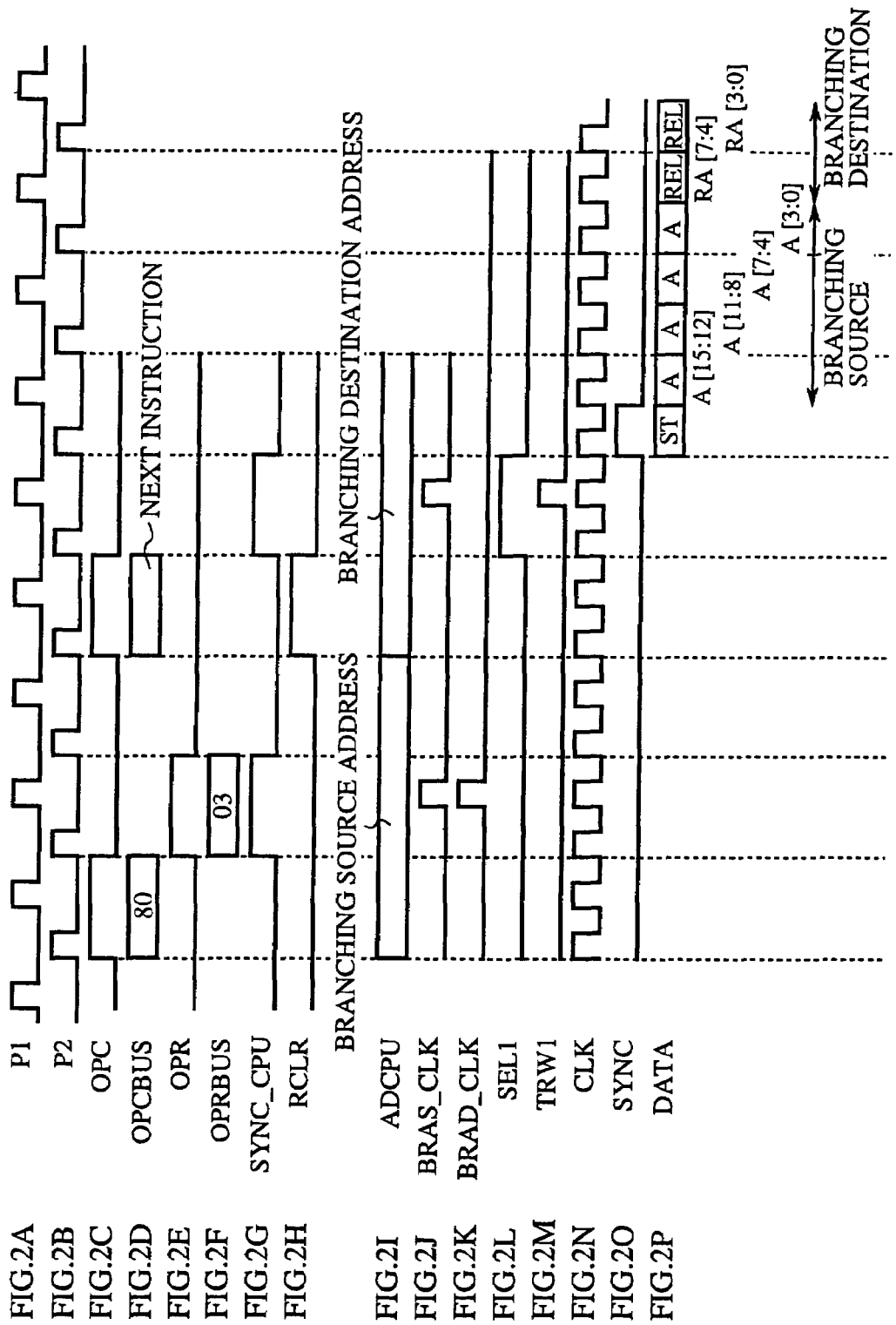
FIGS. 2A–2P are timing charts of signals in the circuit of FIG. 1.

FIGS. 2A–2P are timing charts of the signals in the circuit of FIG. 1. As shown in FIGS. 2A, 2G and 2J, the AND circuit 34 ANDs the synchronization signal SYNC_CPU occurring during the execution and the basic clock P1 of the CPU 2, thus outputting BRAS_CLK resulting from the ANDing.

When it is determined that the branching destination address is output, the selector circuit 33 connects the operand bus OPRBUS to an input terminal of the branching destination address latch 37 and feeds the operand fetch signal OPR occurring during the execution to an input of the AND circuit 36.

When the CPU 2 outputs the branching destination address in a relative address representation to the operand bus OPRBUS after outputting the branching source address, the branching destination address latch 37 latches the branching destination address in synchronization with BRAD_CLK output from the AND circuit 36.

As shown in FIGS. 2A, 2E and 2K, the AND circuit 36 ANDs the operand fetch signal OPR occurring during the execution and the basic clock P1 of the CPU 2, thus outputting BRAD_CLK resulting from ANDing.

The selector 42 captures the contents of the event output from the branch event generation circuit 31, that is, the status information ST, the branching source address output from the branching source address latch 35 and the branching destination address output from the branching destination address latch 37 in the stated order. When the selector control signal SELL is brought to a high level, the selector 42 opens its internal gate. When the trace memory write signal TRW1 is brought to a high level, the selector writes the status information ST, the branching source address and the branching destination address in the trace memory 43.

When the contents of the event output from the branch event generation circuit 31 are written in the trace memory 43, the contents of the event are sequentially read by the trace circuit 44. The trace circuit 44 then outputs the contents of the event to the external debugger via the trace bus and the DATA terminal, in synchronization with the clock signal CLK and the synchronization signal SYNC.

For example, as shown in FIG. 2P, when the synchronization signal SYNC goes high, indicating the head of the event, the trace circuit 44 outputs the status information ST, the branching source address A[15:12], the branching source address A[11:8], the branching source address A[7:4], the branching source address. A[3:0], the branching destination address RA[7:4] and the branching destination address RA[3:0] in the stated order, to the 4-bit DATA terminal.

In this illustration, A[:] indicates bits corresponding to the absolute address; RA[:] indicates corresponding bits to the relative address.

For example, A[7:4] indicates absolute address values from the significant bit to the fourth significant bit; and RA[7:4] indicates relative address values from the seventh significant bit to the fourth significant bit.

In the first embodiment, a total of seven CLK cycles are required to output the event of the branch instruction, two cycles fewer than in the related art.

Figure 9:
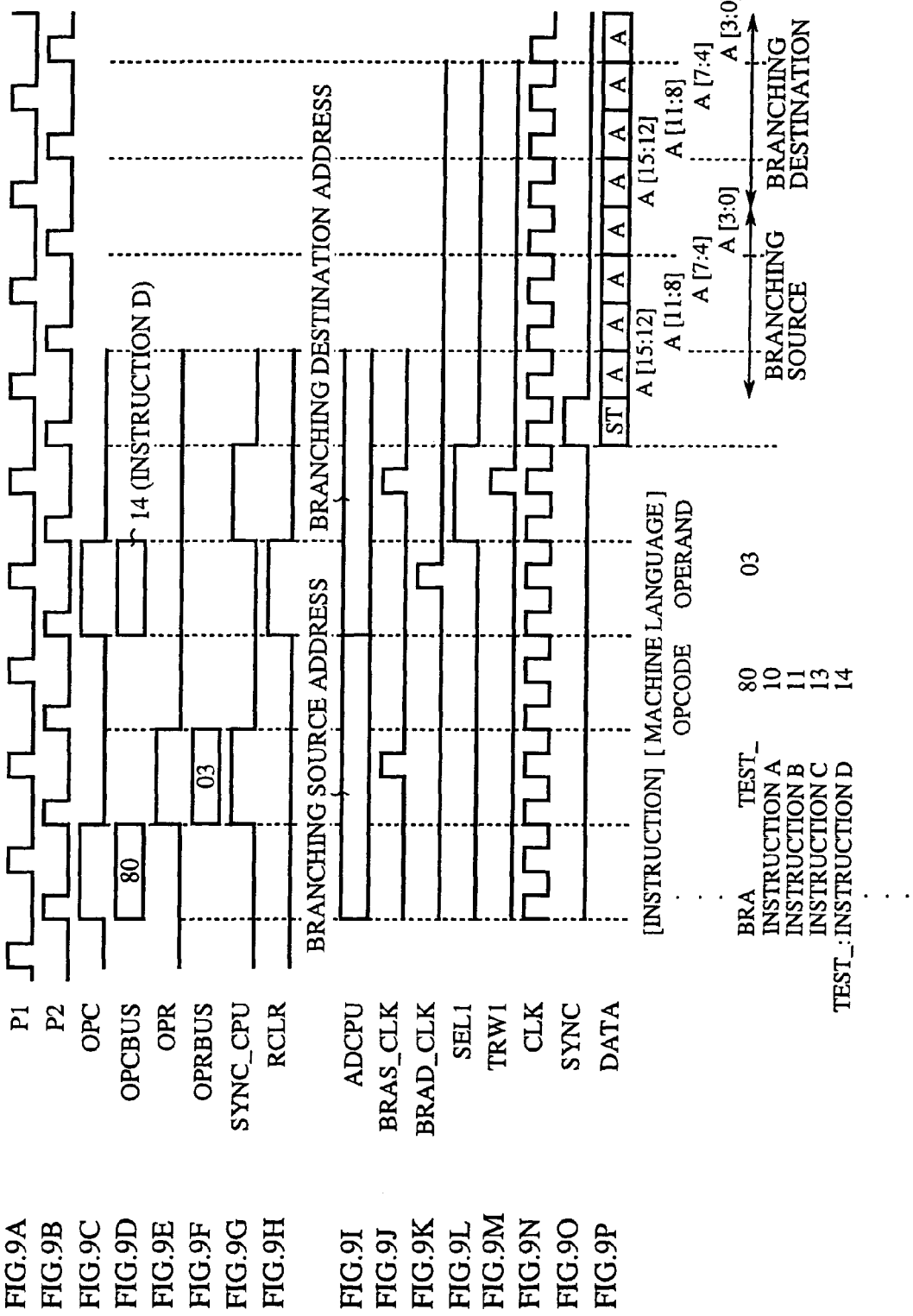
FIGS. 9A–9P are timing charts of signals.

FIGS. 9A–9P are timing charts of the signals in the circuit of FIG. 7. Referring to FIG. 9B, P2 indicates a basic clock of the CPU 2, OPC indicates the opcode fetch signal occurring during the execution, and OPCBUS indicates an opcode.

The actual branching destination address (absolute address) is determined by the external debugger from the branching destination address in a relative address representation. Simply by adding the branching destination address in a relative address representation to the branching source address or by subtracting the branching destination address in a relative address representation from the branching source address, the actual branching destination address is determined.

As has been described, according to the first embodiment, the branching source address in an absolute address representation and the branching destination address in a relative address representation from the CPU 2 so that the branching source address and the branching destination address are output to the trace bus. Therefore, the number of CLK cycles required to output the event of the branch instruction is reduced without increasing the number of DATA terminals or the capacity of the trace memory 43.

Second Embodiment

In the first embodiment, the branching destination address in a relative address representation is captured on the operand bus OPRBUS so that the branching destination address is output to the trace bus. If the control signal output from the CPU 2 indicates output of the branching destination address in an absolute address representation, the selector circuit 33 may connect the address bus ADCPU to the input terminal of the branching destination address latch 37 and feed the branching destination signal RCLR occurring subsequent to the execution of the branch signal to the input of the AND circuit 36. With this configuration, the branching destination address in an absolute address representation is imported from the CPU 2 and is output to the trace bus.

According to the second embodiment, a total of nine CLK cycles are required to output the event of the branch instruction as in the related-art example. However, an event of a single branch instruction is sufficient to specify the branching destination address even when the interval between the branching source address and the branching destination address is so wide that the relative address cannot be used to specify the branching destination address.

Third Embodiment

Figure 3:
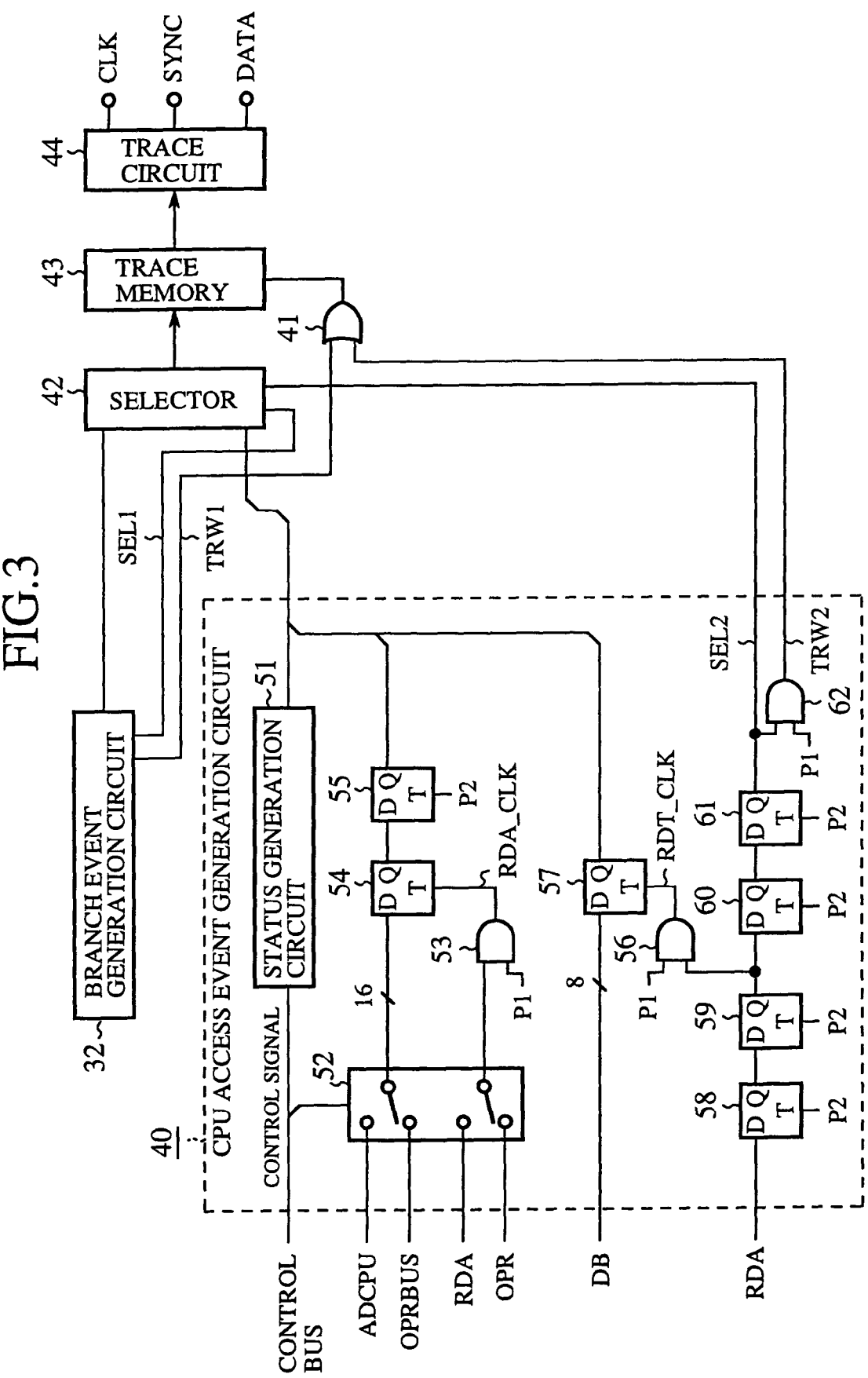
FIG. 3 shows the construction of the trace control circuit according to the third embodiment of the present invention.

FIG. 3 shows the construction of the trace control circuit according to the third embodiment of the present invention. In FIGS. 1 and 3, like numerals represent like components and the description thereof is not repeated.

Referring to FIG. 3, numeral 51 indicates a status generation circuit for outputting status information ST indicating access trace in the memory 4 or the register circuit 10. Numeral 52 indicates a selector circuit (determining means) for determining whether the address output from the CPU 2 is a relative address or an absolute address based on the control signal output from the CPU 2. If it is determined that the absolute address is output, the selector circuit 52 connects the address bus ADCPU to an input terminal of an address latch 54. If it is determined that the relative address is output, the selector circuit 52 connects the operand bus OPRBUS to the input terminal of the address latch 54.

Numeral 53 indicates an AND circuit for ANDing two signals, the first signal being the access signal RDA occurring during the execution or the operand fetch signal OPR occurring during the execution, and the second signal being the basic clock P1 of the CPU 2. Numeral 54 indicates the address latch for either latching the absolute address output from the CPU 2 to the address bus ADCPU, in synchronization with RDA_CLK, or latching the relative address output from the CPU 2 to the operand bus OPRBUS, in synchronization with RDA_CLK. Numeral 55 indicates an address latch for latching the absolute address or the relative address output from the address latch 54 in synchronization with the basic clock P2 of the CP 2. The AND circuit 53, the address latches 54 and 55 constitute address capturing means.

Numeral 56 indicates an AND circuit for ANDing the output signal from a flip-flop 59 and the basic clock P1 of the CPU 2; and 57 indicates a data latch for latching access data output from the CPU 2 to the data bus DB, in synchronization with RDT_CLK. The AND circuit 57 and the data latch 57 constitute data capturing means.

Numerals 58–61 indicate flip-flops for latching the access signal RDA occurring during the execution, in synchronization with the basic clock P2 of the CPU 2, and for generating a selector control signal SEL2. Numeral 62 indicates an AND circuit for ANDing the selector control signal SEL2 output from the flip-flop 61 and the basic clock P1 of the CPU 2.

A description will now be given of the operation according to the third embodiment.

The following description relates to the operation performed when the CPU 2 executes the access instruction.

When the CPU 2 outputs the control signal requesting execution of the access instruction to the control bus, the status generation circuit 51 of the CPU access event generation circuit 40 recognizes the request for execution of the access instruction. The status generation circuit 51 then generates the status information ST indicating access trace so as to inform the external debugger that the CPU 2 event is the access trace.

The selector circuit 52 determines whether the address accessed by the CPU 2 is in a relative address representation or an absolute address representation, based on the control signal output from the CPU 2.

If it is determined that the address accessed by the CPU 2 is in an absolute address representation, the selector circuit 52 connects the address bus ADCPU to the input terminal of the address latch 54 and feeds the access signal RDA occurring during the execution of the access instruction to the input of the AND circuit 53.

In the third embodiment, it is assumed that the address accessed by the CPU 2 is a relative address. A reference address (described later), output from the trace circuit 44 to serves as a reference for the relative address, is normally in an absolute address representation. The CPU 2 outputs the reference address in an absolute address representation.

In this case, when the CPU 2 outputs the address in an absolute address representation (normally, the reference address) to the address bus ADCPU, the address latch 54 latches the address in synchronization with RDA_CLK output from the AND circuit 53 so that the address latch 55 latches the address output from the address latch 54 in synchronization with the basic clock P2 of the CPU 2.

Figure 4:
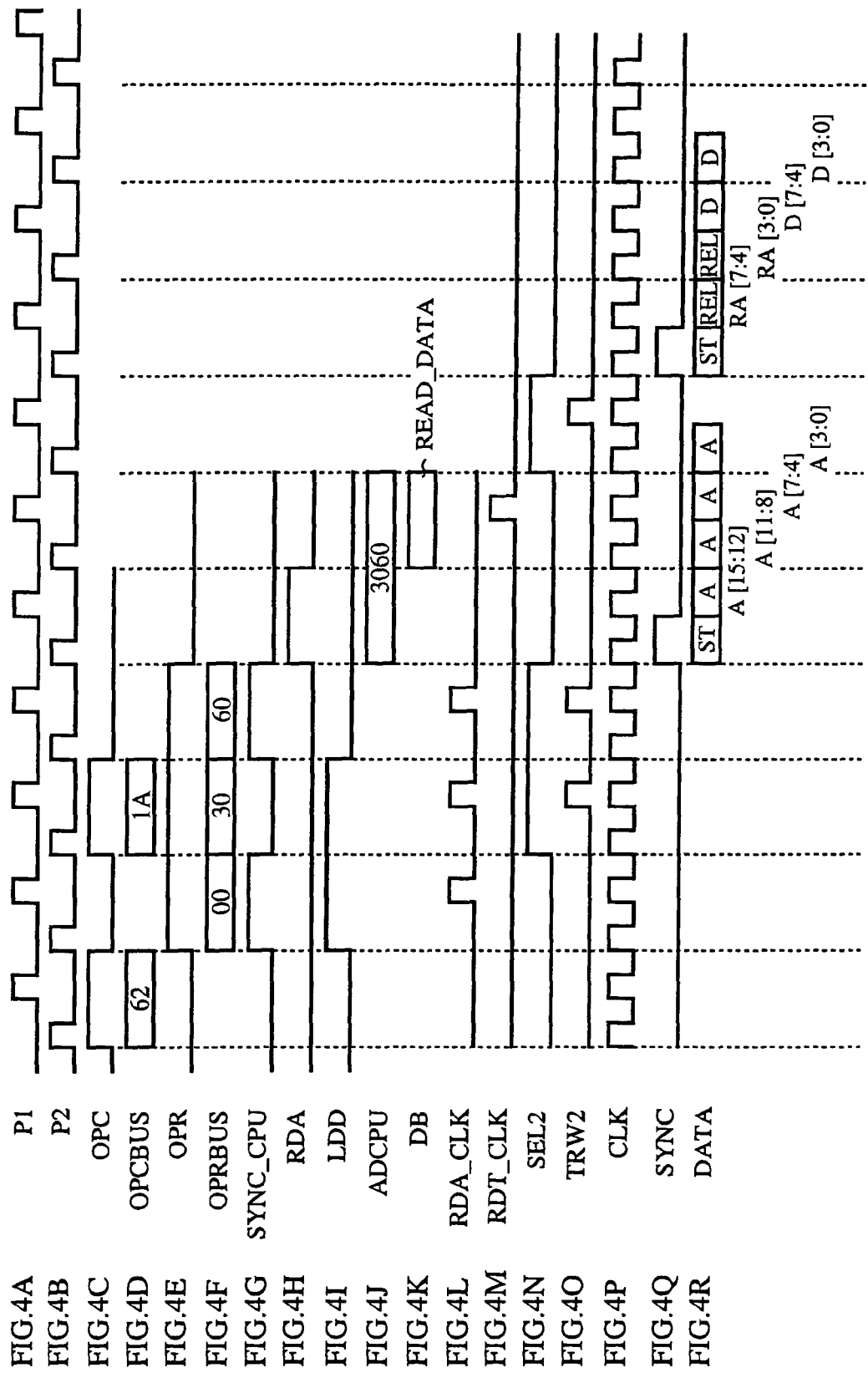
FIGS. 4A–4R are timing charts of signals in the circuit of FIG. 1.

FIGS. 4A–4R are timing charts of signals in the circuit of FIG. 3. Referring to FIGS. 4A, 4H and 4L, the AND circuit 53 ANDs the access signal RDA occurring during the execution of the access instruction and the basic clock P1 of the CPU 2 so as to output RDA_CLK resulting from the ANDing (this state is not shown in FIGS. 4A–4R).

When the address accessed by the CPU 2 is in a relative address representation, the operand bus OPRBUS is connected to the input terminal of the address latch 54 and the operand fetch signal OPR occurring during the execution is fed to the input of the AND circuit 53.

When the CPU 2 outputs the address in an absolute address representation to the operand bus OPRBUS, the address latch 54 latches the address in synchronization with RDA_CLK output from the AND circuit 53 so that the address latch 55 latches the address output from the address latch 54 in synchronization with the basic clock P2 of the CPU 2.

As shown in FIGS. 4A, 4E and 4L, the AND circuit 53 ANDs the operand fetch signal OPR occurring during the execution and the basic clock P1 of the CPU 2 so as to output RDA_CLK resulting from the ANDing.

When the CPU 2 outputs the address to be accessed (relative address) instead of the reference address, the 8-bit access data accessed by the CPU 2 is output to the data bus DB. The data latch 57 latches the access data in synchronization with RDT_CLK output from the AND circuit 56. When the access instruction from the CPU 2 is a read instruction, the read data is output to the data bus DB. When the access instruction from the CPU 2 is a write instruction, the write data is output to the data bus DB.

The AND circuit 56 ANDs the output signal from the flip-flop 59 and the basic clock P1 of the CPU 2 so as to output RDT_CLK resulting from the ANDing.

The selector 42 imports the contents of the event output from the CPU access event generation circuit 40. More specifically, when outputting the reference address, the selector 42 imports the status information ST output from the status generation circuit 51 and the absolute address output from the address latch 55 in the stated order. When the selector control signal SEL2 is brought to a high level, the selector 42 opens its internal gate. When the trace memory write signal TRW2 is brought to a high level, the selector 42 writes the status information ST and the absolute address in the trace memory 43.

When outputting the relative address, the selector 42 captures the status information ST output from the status generation circuit 51, the relative address output from the address latch 55 and the read data (or the write data) output from the data latch 57 in the stated order. When the selector control signal SEL2 is brought to a high level, the selector 42 opens its internal gate. When the trace memory write signal TRW2 is brought to a high level, the selector 42 writes the status information ST, the relative address and the read data (or the write data) to the trace memory 43.

When the contents of the event output from the CPU access event generation circuit 40 are written to the trace memory 43, the trace circuit 44 sequentially reads the contents of the event. The trace circuit 44 outputs the contents of the event to the external debugger via the 4-bit DATA terminal and the trace bus, in synchronization with the synchronization signal SYNC.

As shown in FIG. 4R, when the contents of the event are related to the output of the reference address, the trace circuit 44 outputs the status information ST, the address A[15:12], the address A[11:8], the address A[7:4] and the address A[3:0] in the stated order via the 4-bit DATA terminal, in response to the synchronization signal SYNC being brought to a high level, indicating the head of the event (the leftmost high level in FIG. 4R).

As shown in FIG. 4R, when the contents of the event are related to the output of the relative address, the trace circuit 44 outputs the status information ST, the address RA[7:4], the address RA[3:0], the data D[7:4] and the data D[3:0] in the stated order via the 4-bit DATA terminal, in response to the synchronization signal SYNC being brought to a high level, indicating the head of the event (the second leftmost high level in FIG. 4R).

In this illustration, A[:] indicates bits corresponding to the absolute address; RA[:] indicates bits corresponding to the relative address; and D[:] indicates bits corresponding to the read data (or the write data). For example, A[7:4] indicates absolute address values from the seventh significant bit to the fourth significant bit.; RA7:4] indicates relative address values from the seventh significant bit to the fourth significant bit; and D[7:4] indicates read data (write data) values from the seventh significant bit to the fourth significant bit.

According to the third embodiment, a total of five CLK cycles are required to output the status information ST, the relative address and the read data (or the write data). Referring to FIG. 4I, LDD indicates an address setting signal.

The external debugger can determine the address actually access (absolute address) from the branching destination address in a relative address representation. More specifically, the address actually accessed is identified simply by adding the relative address to or subtracting the relative address from the reference address.

Figure 10:
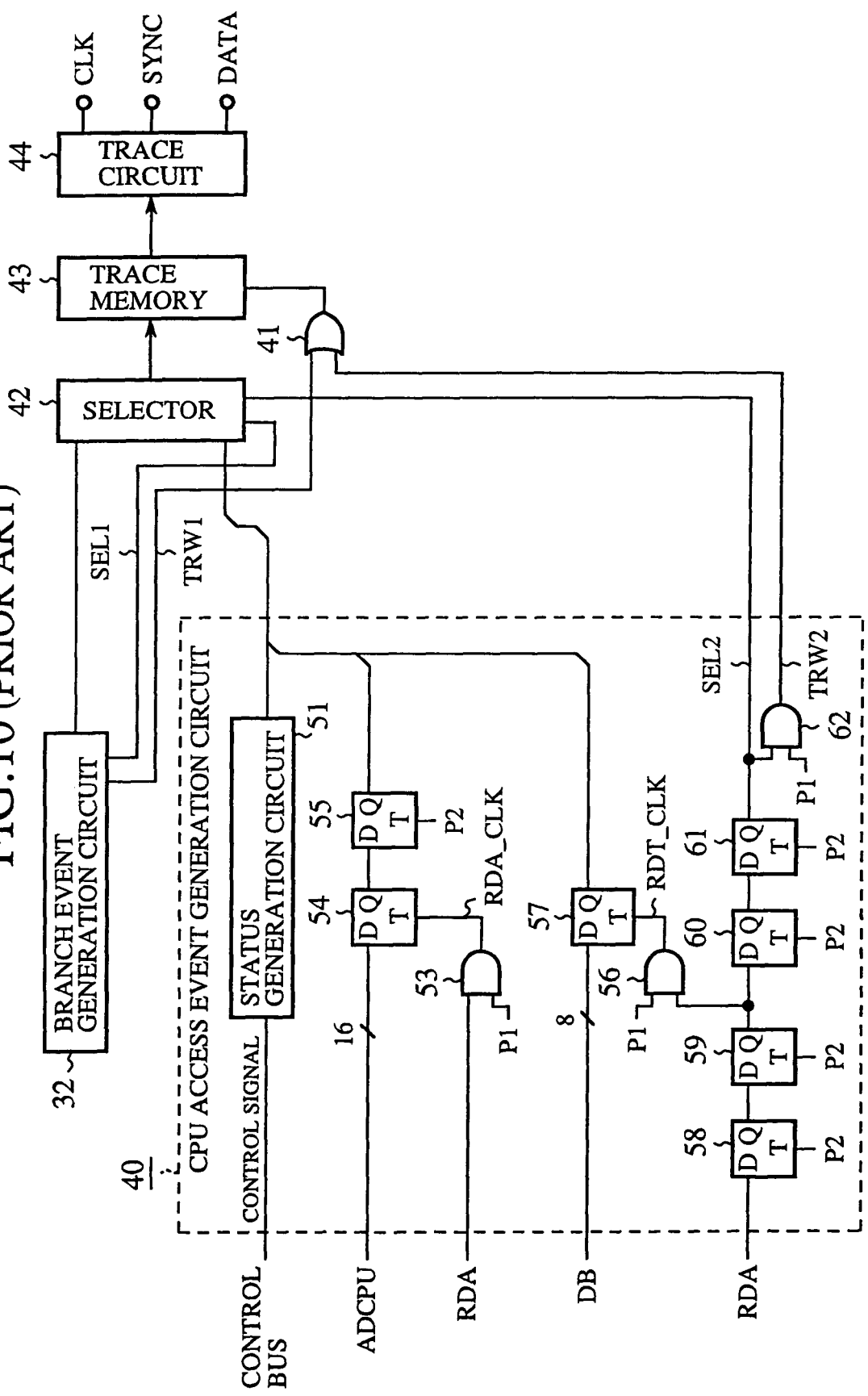
FIG. 10 shows the construction of the trace control circuit according to the related art.

In the related-art trace control circuit as shown in FIG. 10, the selector circuit 52 is absent. The address bus ADCPU remains connected to the input terminal of the address latch 54. The access signal RDA occurring during the execution of the access instruction continues to be fed to the input of the AND circuit 53. Thus, when the access instruction is executed, it is necessary to continue to output the address in an absolute address representation and the read data (or the write data).

FIGS. 11A–11Q are timing charts of the signals in the circuit of FIG. 10. As shown in FIG. 11Q, a total of seven CLK cycles are required to output the status information ST, the absolute address and the read data (or the write data). That is, additional two cycles are required as compared to the third embodiment.

As has been described, according to the third embodiment, the reference address is output to the trace bus. In addition, the relative address of the memory 4 or the register circuit 10 and the read data (or the write data) are output to the trace bus. Therefore, the number of CLK cycles required to output the event of the access instruction is reduced without increasing the number of DATA terminals and capacity of the trace memory 43.

Fourth Embodiment

Figure 5:
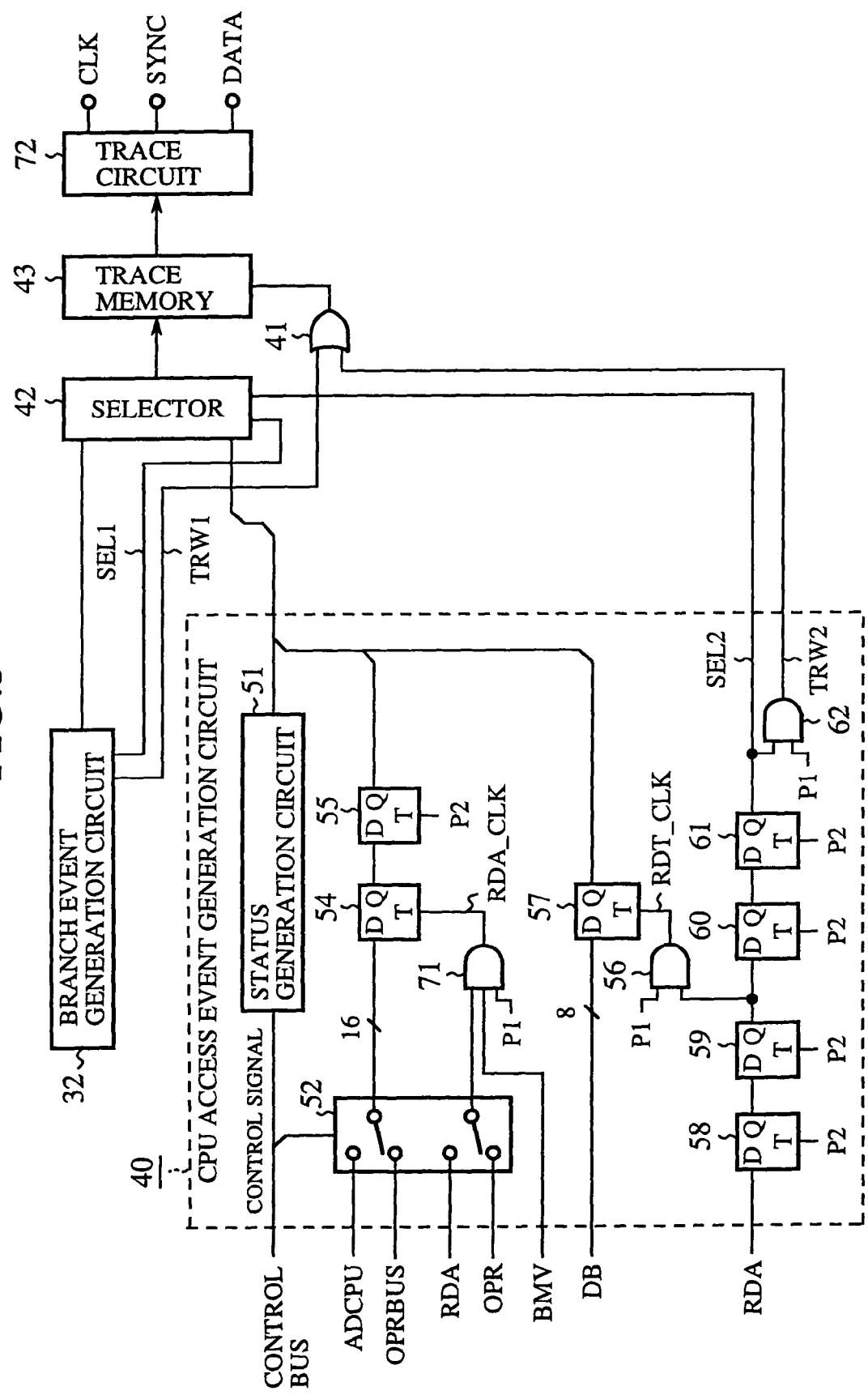
FIG. 5 shows the trace control circuit according to the fourth embodiment of the present invention.

FIG. 5 shows the construction of the trace control circuit according to the fourth embodiment of the present invention. In FIGS. 3 and 5, like numerals represent like components and the description thereof is not repeated.

Numeral 71 indicates an AND circuit for ANDing three signals: the first signal being the access signal RDA occurring during the execution or the operand fetch signal OPR occurring during the execution, the second signal being a control signal BMV and the third signal being the basic clock P1 of the CPU 2. The AND circuit 71 outputs RDA_CLK. Numeral 72 indicates a trace circuit for outputting to the trace bus the status information ST, the address and the access data (read data, write data) output from the CPU access event generation circuit 40, when the CPU 2 accesses the memory 4 or the register circuit 10 for the first time in a block transfer. In the second and subsequent accesses, the trace circuit 72 outputs to the trace bus the status information ST and the access data output from the CPU access event generation circuit 40.

A description will now be given of the operation according to the fourth embodiment.

In the third embodiment, a description was given of the event contents output when the CPU 2 accesses the memory 4 or the register circuit 10. The CPU 2 usually incorporates a block transfer instruction for successively transferring a block of data to a specified range addresses when accessing the memory 4 or the register circuit 10. A block transfer instruction is executed by repeatedly executing the read instruction (access instruction) or the write instruction (access instruction) according to the third embodiment.

In the related art, as shown in FIGS. 12A–12M, the trace output occurring when the block transfer instruction is executed includes repeated outputs of the status information ST, the transfer source address, the read address, the status information ST, the transfer destination address and the write data. For this reason, the trace memory 43 built in the trace control circuit is provided with a large capacity to prevent overflow from occurring in the trace memory 43.

The fourth embodiment is provided not only to adapt for high speed operation of the microcomputer 1 but also to reduce the size of the trace memory 43.

Figure 6:
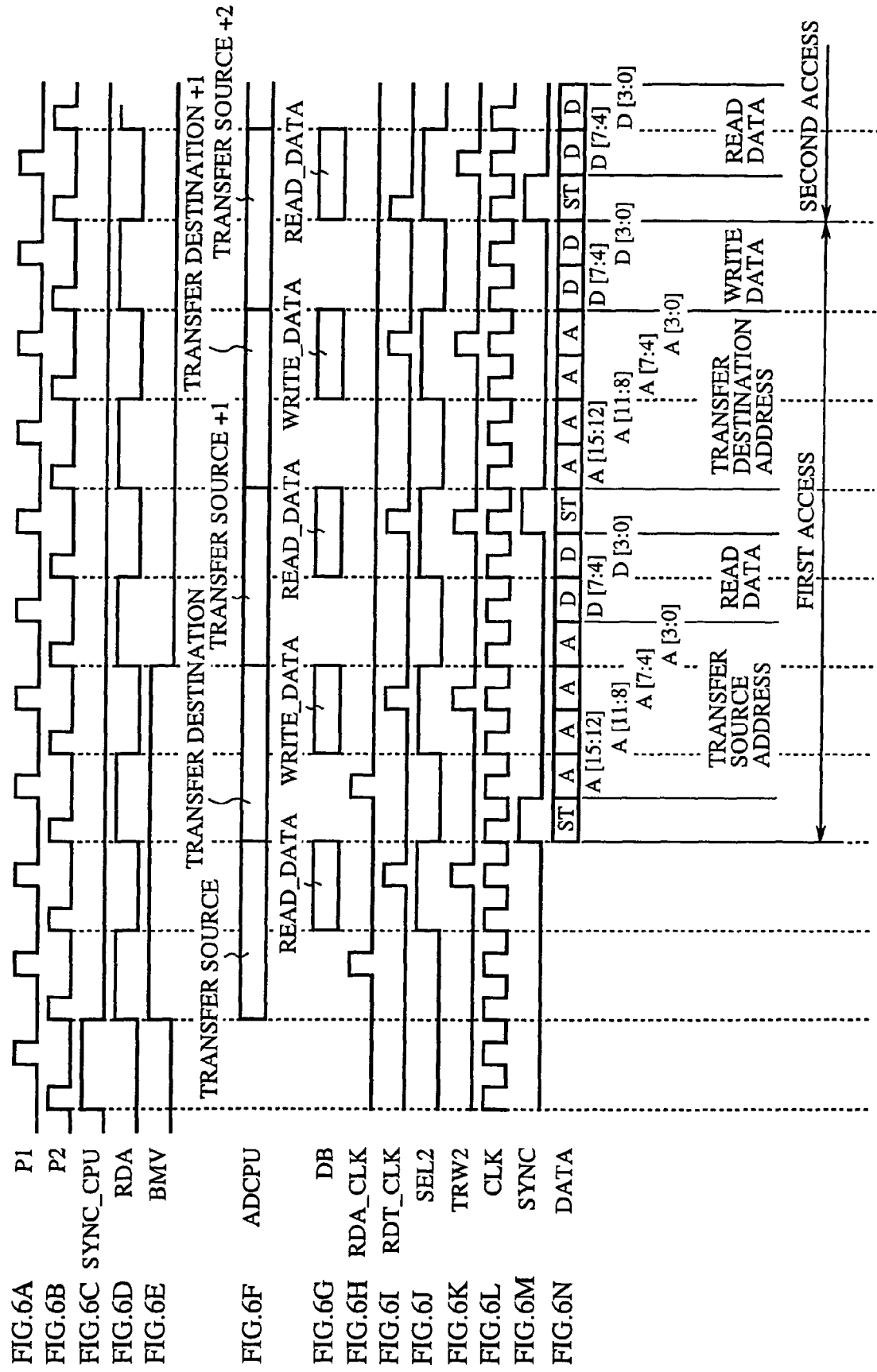
FIGS. 6A–6N are timing charts of signals.

When the block transfer instruction is executed, the CPU 2 outputs the control signal BMV only upon the first access (i.e. the first read and write operation) so that the address (transfer source address or transfer destination address) is output from the CPU access event generation circuit 40 only upon the first access. In the example of FIGS. 6A–6N, the control signal BMV is output upon the first read and write operation.

Upon the first access, the trace circuit 72 successively outputs the trace information ST, the transfer source address, the read data, the status information ST, the transfer destination address and the write data, which are output from the CPU access event generation circuit 40 and written in the trace memory 43.

Upon the second and subsequent accesses, the CPU access event generation circuit 40 does not output the address so that the trace circuit 72 outputs the status information ST, the read data, the write data written in the trace memory 43.

As has been disclosed, according to the fourth embodiment, upon the first access in the block transfer, the status information ST, the address and the access data are output to the trace bus. Upon the second and subsequent accesses, only the status information ST and the access data are output to the trace bus. The trace control circuit according to the fourth embodiment is not only adaptable for high speed operation of the microcomputer 1 but also for reduction in the size of the trace memory 43.

Fifth Embodiment

In the fourth embodiment, the absolute address is output to the trace bus upon the first access. Alternatively, the relative address may be output to the trace bus by outputting the reference address for the transfer source address and the transfer destination address.

In this way, the trace control circuit is adapted for high-speed operation of the microcomputer 1.

Various advantages of the present invention will now be listed below.

In accordance with one aspect of the present invention, the branching source address in an absolute address representation and the branching destination address in a relative address representation are imported from the CPU so that the branching source address and the branching destination address are output to the trace bus. Accordingly, the trace control circuit can be made to adapt for high-speed operation of the microcomputer without increasing the number of DATA terminals.

In accordance with another aspect of the present invention, when the control signal output from the CPU indicates an output of the branching destination address in an absolute address representation, the branching destination address in an absolute address representation is imported from the CPU. Therefore, an event of a single branch instruction is sufficient to specify the branching destination address even when the interval between the branching source address and the branching destination address is so wide that the relative address cannot be used to specify the branching destination address.

In accordance with still another aspect of the present invention, the reference address is output to the trace bus and the relative address of the memory imported by the address capturing means and the access data imported by the data capturing means are output to the trace bus. Accordingly, the trace control circuit can be made to adapt for high speed operation of the microcomputer without increasing the number of DATA terminals.

In accordance with still another aspect of the present invention, a determination is made based on the control signal output from the CPU as to whether the relative memory address or the absolute memory address is output from the CPU so that the relative address or the absolute address is captured. Therefore, an event of a single access instruction is sufficient to specify the address actually accessed, even when the relative address cannot be used to specify the address actually addressed.

In accordance with still another aspect of the present invention, the address and the data are output to the trace bus upon the first access in a block transfer. Upon the second and subsequent access, the data is output to the trace bus. Therefore, the trace control circuit is adapted for high speed operation of the microcomputer and reduction in the size of the trace memory.

In accordance with yet another aspect of the present invention, the reference address is output to the trace bus when the address captured by the address capturing means is a relative address. The trace control circuit is even more adapted for high speed operation of the microcomputer.

The present invention is not limited to the above-described embodiments, and variations and modifications may be made without departing from the scope of the present invention.

What is claimed is:

1. A trace control circuit comprising:
   address capturing means for capturing a relative address in a memory accessed by a CPU;
   data capturing means for capturing access data of the CPU;
   output means for outputting a reference address to a trace bus and outputting the relative address in the memory captured by the address capturing means and the access data captured by the data capturing means; and
   determining means for determining whether the CPU outputs the relative address in the memory or the absolute address thereof, and for requesting the address capturing means to capture one of the relative address and the absolute address.

2. A trace control circuit comprising:
   address capturing means for capturing an address in a memory accessed by a CPU;
   data capturing means for capturing data for block transfer; and
   output means for outputting to a trace bus the address captured by the address capturing means and the data captured by the data capturing means upon a first access in the block transfer, and for outputting the data captured by the data capturing means to the trace bus upon a second and subsequent accesses.

3. The trace control circuit according to claim 2, wherein the output means outputs a reference address to the trace bus, when the address captured by the address capturing means is a relative address.

* * * * *